United States Patent [19]

Barley et al.

[11] 3,772,584

[45] Nov. 13, 1973

[54] HOMODYNE MULTIPLIER

[75] Inventors: Thomas A. Barley; Gustaf J. Rast, Jr., Huntsville, Ala.

[73] Assignee: The United States of America as represented by the Secretary of the Army

[22] Filed: Sept. 14, 1972

[21] Appl. No.: 289,025

[52] U.S. Cl. .................... 321/60, 307/220, 328/20, 325/444

[51] Int. Cl. .................... H02m 5/16

[58] Field of Search .................... 307/220; 328/20, 328/15, 38; 325/442, 444, 446; 321/60

[56] References Cited

UNITED STATES PATENTS

| | | | |
|---|---|---|---|
| 3,329,884 | 7/1967 | Gewartowski | 321/60 |
| 3,161,816 | 12/1964 | Holcomb | 328/20 X |
| 2,979,611 | 4/1961 | Halina | 325/442 X |
| 3,378,769 | 4/1968 | Luzzatto | 321/60 X |
| 3,487,290 | 12/1969 | Johnston | 321/60 |
| 3,602,824 | 8/1971 | Rusch | 321/60 X |
| 3,665,508 | 5/1972 | Gawler | 321/60 X |

*Primary Examiner*—William M. Shoop, Jr.
*Attorney*—Harry M. Saragovitz et al.

[57] ABSTRACT

In the homodyne multiplier, a frequency mixer has both the radio frequency and local oscillator input ports driven by the same signal source, generating multiples of the input frequency as output signals. The signals coupled to the respective input ports of the mixer are controllable in phase and amplitude with respect to each other. The output of the mixer then generates a large number of signals which have a high degree of phase coherence with the original driving signal. Since the mixer functions as a non-linear combination element, phase perturbations are not internally generated which adversely affect coherence. Attenuators in the transmission lines to the mixer inputs allow adjustment of signal levels.

7 Claims, 10 Drawing Figures

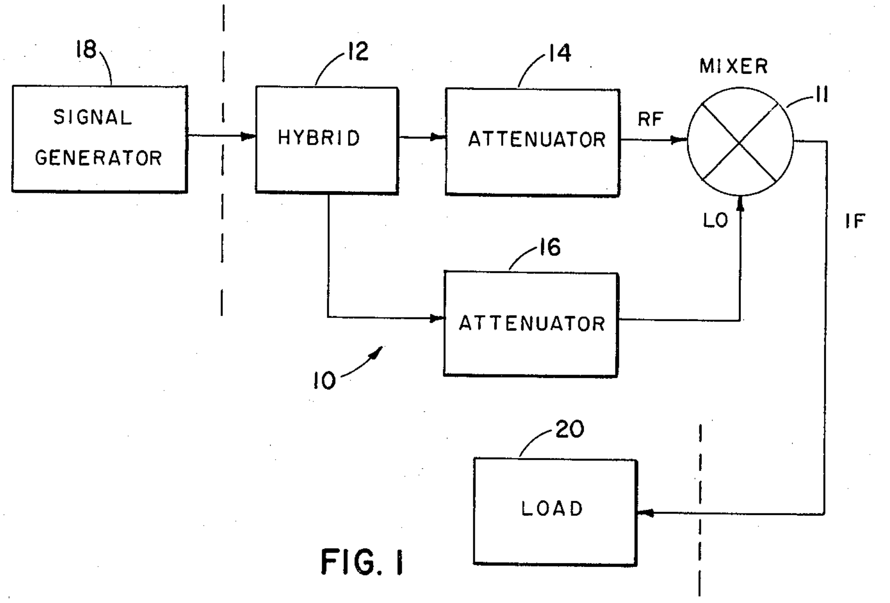
FIG. 1
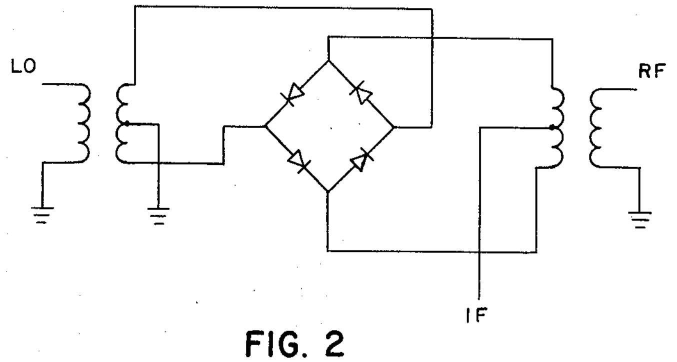
FIG. 2
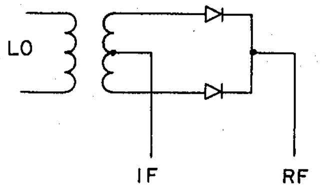
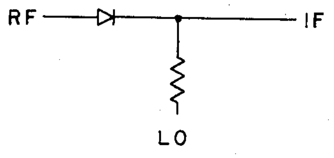
FIG. 3 FIG. 4

HOMODYNE MULTIPLIER

SUMMARY OF THE INVENTION

In a homodyne multiplier energy from a single source is split into two branches. Attenuators adjust the signal parameters in each branch and couple the signals to respective inputs of a frequency mixer for generating an output signal spectrum which is phase related to the input signal. Both phase and amplitude can be simultaneously and independently varied to enhance a desired portion of the output spectrum. The multiplier performs the multiplying process over a considerable frequency range, with only low signal power requirements. Amplitude variations are negligible when input frequencies change. Feedthrough power levels which occur in the homodyne multiplier using a balanced mixer are very low, reducing need for costly filtering of the output signals.

BRIEF DESCRIPTION OF THE DRAWINGS

FIG. 1 is a block diagram of a homodyne multiplier circuit.

FIG. 2 is a simplified schematic of a typical double balanced mixer.

FIG. 3 is a schematic of a typical single balanced mixer circuit.

FIG. 4 is a schematic of a typical single ended mixer.

DESCRIPTION OF THE PREFERRED EMBODIMENT

Figure 6:
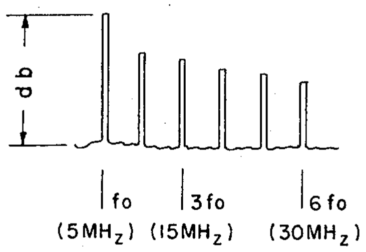
FIG. 6 is a portion of the output frequency spectrum of a homodyne multiplier having a single balanced mixer.

Referring now to the drawings, FIG. 1 discloses a homodyne multiplier circuit 10 wherein a frequency mixer 11 has input ports RF and LO and an output port IF. A hybrid junction 12 has a first output coupled through a variable attenuator 14 to the RF input and a second output coupled through a variable attenuator 16 to the LO input of the mixer. An oscillator or signal generator 18 has an output coupled as an input to hybrid 12 for coupling the desired radio frequency energy thereto. The IF output of mixer 11 is coupled to the load circuitry 20 which may be, for example, a spectrum analyzer, an up converter, or an additional multiplier circuit 10.

A signal coupled from signal source 18 to hybrid 12 is divided into two branches. Each branch has separately adjustable attenuators for controlling the signal level coupled to mixer 11. Hence, the same frequency signal is introduced to the RF and LO ports of the mixer and may be at the same or different intensities By introducing precisely equal frequencies as the driving signals, output signals are generated that are higher order multiples of the input frequency. Therefore, the output port (IF) contains spectral components which are integral multiples of the input signal. The driving source 18 furnishes all the energy required for the multiplier.

When a signal is mixed with itself as is done in the homodyne multiplier, the first sideband occurs at twice the input frequency while the other sidebands are spaced apart by the input frequency. Thus, with an input of $f_0$, the first sideband is $2f_0$, the third sideband is $4f_0$, etc.

Figure 5:
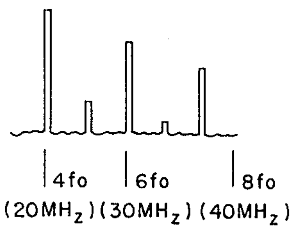
FIG. 5 is a portion of the output frequency spectrum of a homodyne multiplier having a double balanced mixer.

Mixer 11 may be any typical frequency mixer such as the well known double balanced mixer, single balanced mixer, or single ended mixer. A double balanced mixer is shown in FIG. 2 wherein the RF input and LO input are coupled through respective transformers to a diode quad. The center tapped secondary of one of the input transformers is coupled as the IF output of the homodyne multiplier. The double balanced mixer exhibits a characteristic of suppressing odd harmonics at all power levels. Suppression is not necessarily uniform, with some adjacent related sidebands being enhanced more than others as shown in FIG. 5. In FIG. 5 the multiplier operates with +10 dbm into the RF input and +10 dbm into the LO input. For a 5 MHz input frequency a display of 30 MHz is shown on the spectrum analyzer, although the output spectrum is not necessarily limited to 30 MHz.

The single balanced mixer of FIG. 3 has the LO input coupled across a transformer to a pair of diodes. The RF input is coupled to the opposite terminals of the diodes and the IF output is taken from the center tapped secondary of the transformer. As shown in FIG. 6, all sidebands of the output spectrum have good signal strength. Changes in the input power levels have little effect on the spectrum, merely re-adjusting the absolute output power level. In FIG. 6, a 30 MHz output spectrum is shown for a 5 MHz input signal. The signal level for the RF input is +10 dbm and for the LO input 0 dbm.

Figure 7:
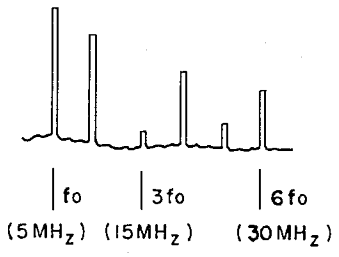
FIG. 7 is a portion of the output frequency spectrum of a homodyne multiplier having a single ended mixer.

The single ended mixer of FIG. 4 has an RF input to a single diode and a LO input coupled through a resistance to the other side of the diode, from which the output IF signal is obtained. A homodyne multiplier employing the single ended mixer has an output response which is dependent upon the power level input. The output spectrum of FIG. 7 is across 30 MHz and has a +10 dbm RF input and a 0 dbm LO input.

For a homodyne multiplier having high sidebands levels at odd multiples, the double balanced mixer functions best as the non-linear combining element. If high energy levels are desired at several sidebands simultaneously, a single balanced mixer provides better non-linear combining of the multiplier signals. A single ended mixer has an advantage of minimizing the number of sidebands present in the output spectrum.

Figure 8:
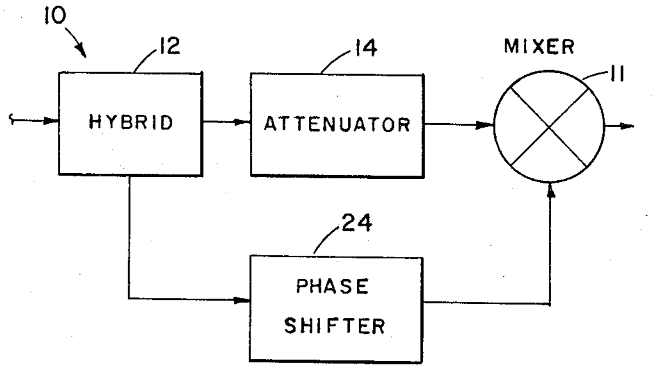
FIG. 8 is a block diagram of a homodyne multiplier circuit having both amplitude and phase control adjustable.
Figure 9:
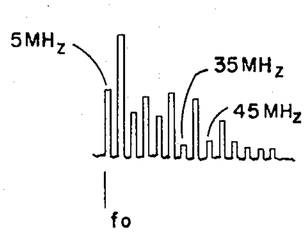
FIGS. 9 and 10 are portions of output frequency spectrums of the homodyne multiplier having phase control.
Figure 10:
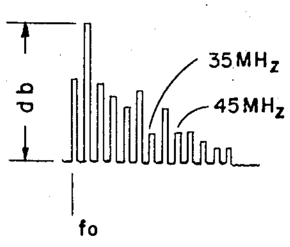

The homodyne multiplier of FIG. 8 is the same basic circuit as FIG. 1 with attenuator 16 replaced by a phase shifter 24. By providing output signal phase control independently from amplitude control, an improved output spectrum is obtainable. FIGS. 9 and 10 are output spectrums from the circuit of FIG. 8, disclosing how the nulls in signals are changed considerably by varying both phase and amplitude in the combining signals. For example, in FIG. 9 the basic input frequency, $f_0$, is 5 MHz. The spectral lines are separated by 5 MHz spacing, with the spectral lines for 35 MHz and 45 MHz being depressed. After phase and amplitude adjustment to modify the output spectrum, FIG. 10 discloses the formerly depressed signals to be enhanced to a prominent intensity level. Just as the phase and amplitude of the input signals may be adjusted to enhance a given spectral line, they may also be adjusted to reduce or depress an unwanted spectral line. Thus, a spectral line may be enhanced or substantially cancelled by simultaneous amplitude and phase control of the combined input signals. Adjustment may be made to any of the spectral lines. The magnitude of adjustable range is dependent upon which spectral line is adjusted, the spectral lines most distant from the input drive frequency being more responsive than those closer to the drive frequency.

The homodyne multiplier can provide broadband operation at very low power input levels, on the order of +8 dbm or less. The operational frequency range is limited basically only by the associated hardware of a multiplier unit, such as the hybrid or mixer. The homodyne multiplier has been satisfactorily operated from 5 MHz through 400 MHz input drive frequency, with the mixer and hybrid being the components of the circuit which limit the output spectrum.

Although a particular embodiment and form of this invention has been illustrated, it is apparent that various modifications and embodiments of the invention may be made by those skilled in the art without departing from the scope and spirit of the foregoing disclosure. For example, several homodyne multiplier sections may be joined together with each preceding section functioning as a signal source for the next stage or an adjacent stage. A power divider or hybrid coupler may have one or more frequency outputs coupled to using circuitry such as a digital clock and the other output coupled as an input to another homodyne multiplier hybrid for multiplying up. Accordingly, the scope of the invention should be limited only by the claims appended hereto.

We claim:

1. A homodyne frequency multiplier for producing a broad band frequency spectrum and comprising: a frequency mixer having first and second inputs and an output, a hybrid having an input and first and second outputs, a first variable attenuator connected between the first input of said mixer and the first output of said hybrid, and the second output of said hybrid being coupled to the second input of said mixer.

2. A homodyne frequency multiplier as set forth in claim 1 wherein said mixer is a double-balanced mixer for multiplying up by even valued multiples while suppressing odd valued multiples of the output signal; and further comprising a second variable attenuator connected between said second hybrid output and said second mixer input.

3. A homodyne multiplier as set forth in claim 1 wherein said mixer is a single balanced mixer for providing high level, sideband signal strength at all multiples in its operational band.

4. A homodyne multiplier as set forth in claim 1 wherein said mixer is a single ended mixer for providing selective low order sidebands.

5. A homodyne frequency multiplier as set forth in claim 1 and further comprising a phase shifter connected between the second input of said mixer and the second output of said hybrid for variable adjusting the phase relationship between the mixer input signals.

6. A homodyne frequency multiplier as set forth in claim 5 wherein said mixer is a double-banded mixer for multiplying up by even valued multiples while suppressing odd valued mutiples of the output signal.

7. In a homodyne multiplier having a single signal source coupled to both inputs of a frequency mixer, a method of frequency multiplication comprising the steps of:

generating a preselected output frequency signal by said signal source, splitting the output signal into two distinct signal branches, separately adjusting the amplitude of respective signals for providing signal parameter adjustment of each branch, and mixing the respective branch signals in a frequency mixer for providing a homodyne output signal spectrum.

* * * * *